(12) United States Patent
Davis (10) Patent No.: US 9,547,506 B2
(45) Date of Patent: Jan. 17, 2017

(54) SYNTHETIC DEVICE FOR INSTALLATION SOURCE MEDIA

(71) Applicant: VMware, Inc., Palo Alto, CA (US)

(72) Inventor: Darius Davis, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 217 days.

(21) Appl. No.: 14/068,770

(22) Filed: Oct. 31, 2013

(65) Prior Publication Data

US 2015/0121059 A1    Apr. 30, 2015

(51) Int. Cl.
*G06F 9/00* (2006.01)
*G06F 9/24* (2006.01)
*G06F 15/177* (2006.01)
*G06F 9/445* (2006.01)

(52) U.S. Cl.
CPC .................. *G06F 9/44505* (2013.01)

(58) Field of Classification Search
CPC ..................................................... G06F 3/0664
See application file for complete search history.

(56) References Cited

U.S. PATENT DOCUMENTS

| 8,060,877 | B1 | 11/2011 | Waldspurger et al. | |
| 8,335,931 | B2* | 12/2012 | Lee | G06F 21/34 713/192 |
| 8,918,879 | B1* | 12/2014 | Li | G06F 21/568 713/2 |
| 2003/0093653 | A1* | 5/2003 | Oga | G06F 9/445 712/220 |
| 2008/0244096 | A1* | 10/2008 | Springfield | G06F 9/4416 710/5 |
| 2011/0093575 | A1* | 4/2011 | Dube | G06F 15/16 709/223 |
| 2012/0102135 | A1* | 4/2012 | Srinivasan | G06F 9/45558 709/213 |
| 2012/0179904 | A1* | 7/2012 | Dunn | G06F 21/575 713/155 |
| 2013/0139153 | A1* | 5/2013 | Shah | G06F 9/45558 718/1 |

(Continued)

OTHER PUBLICATIONS

GitHub, Virtual VFAT Support (Johannes Schindelin), https://github.com/qemu/qemu/commit/de167e416fa3d6e4bbdcac90973954c6bfae3070, Apr. 28, 2005, 25 pages.

*Primary Examiner* — Mohammed Rehman (57) ABSTRACT

In one embodiment, a computer system provides a process for executing software that cannot be executed in a first configuration. The computer system determines source media for the software stored in a first data store, the source media being in the first configuration. The computer system retrieves metadata relating to executing the software from the source media. The computer system next transforms the retrieved metadata to generate a second configuration of the source media according to a transformation rule set, where the software can be executed in the second configuration, and stores the transformed metadata in a second data store. Next, the computer system presents the second configuration of the source media based on the transformed metadata. Thereafter, the computer system satisfies a request relating to executing the software using the transformed metadata in the second data store, wherein the request is satisfied based on the second configuration.

20 Claims, 7 Drawing Sheets (56) References Cited

U.S. PATENT DOCUMENTS

2014/0115285 A1* 4/2014 Arcese ................ G06F 9/45533
　　　　　　　　　　　　　　　　　　　　　711/162
2014/0130039 A1* 5/2014 Chaplik .............. G06F 9/45558
　　　　　　　　　　　　　　　　　　　　　718/1

* cited by examiner

SYNTHETIC DEVICE FOR INSTALLATION SOURCE MEDIA

BACKGROUND

Generally, in the context of software installations, a computer system uses source media to install the software. For example, a computer system may be running a prior version of an operating system and a user wants to install the newest version of the operating system. The source media includes the latest version of the operating system, and the computer system installs the new operating system by reading files from the source media.

In one case, the owner of the operating system assumes the computer system has the prior version of the operating system installed, and configures the format of the source media such that the prior version of the operating system can boot from the source media in an OS environment. For example, the source media may not be in a bootable configuration. However, the source media provides a program configured to extract the necessary components for installing the OS from the source media, save the components on the hard drive of the computer system, and configure the components in a bootable configuration. However, to be able to run the program, the computer needs to have a prior installation of an operating system. That is, if the computer does not have a prior operating system installed, the computer system cannot first boot thus meaning the computer system can never run the program to generate the bootable version of the new OS.

To allow the computer system to boot from the source media, the computer system must "re-master" the source media before installing the operating system. In the re-mastering process, the computer system creates a new source media by creating a sector-by-sector copy of the source media, and then modifying the copy into a configuration in which the firmware of the computer system can boot from.

While re-mastering may be effective in overcoming the challenges posed by such un-installable OS source media, total re-mastering of source media may have costs. For example, the newly configured copy of the source media requires a large memory allocation, such as several Gigabytes of disk space. Also, the re-mastering process requires upfront time to perform the necessary copying and reconfiguring operations before starting the installation process.

SUMMARY

In one embodiment, a computer system provides a process for executing software that cannot be executed in a first configuration. The computer system determines source media for the software stored in a first data store, the source media being in the first configuration. The computer system retrieves metadata relating to executing the software from the source media. The computer system next transforms the retrieved metadata to generate a second configuration of the source media according to a transformation rule set, wherein the software can be executed in the second configuration. The computer system then stores the transformed metadata in a second data store. Next, the computer system presents the second configuration of the source media based on the transformed metadata. Thereafter, the computer system receives a request relating to executing the software, the request directed to the second configuration of the source media. The computer system then satisfies the request using the transformed metadata in the second data store, wherein the request is satisfied based on the second configuration.

The following detailed description and accompanying drawings provide a better understanding of the nature and advantages of particular embodiments.

BRIEF DESCRIPTION OF THE DRAWINGS

Embodiments of the present disclosure are illustrated by the figures of the accompanying drawings, in which like references refer to like or corresponding parts, and in which.

DETAILED DESCRIPTION

In the following description, for purposes of explanation, numerous examples and specific details are set forth in order to provide a thorough understanding of particular embodiments. It will be evident, however, to one skilled in the art that certain embodiments can be practiced without some of these details, or can be practiced with modifications or equivalents thereof.

Various embodiments of the present disclosure provide improved systems and techniques for installing an operating system (OS) on a virtual machine (VM). In some situations, a virtual machine (or physical computer) cannot directly boot from an OS installation source media. For example, hosts may create virtual machines without installing any prior operating systems on the VMs. That is, VMs are usually initially created without any prior operating system; it is expected that hosts will install the first operating system after the VM is created. In such a case, the VM cannot boot from the source media. For example, the source media stores components needed for installing the OS in a manner that firmware responsible for booting the VM cannot locate a bootloader. This may occur when the source media is configured to install the newest version of an operating system rather than install an operating system on a computer for the first time, for example. This problem may be prevalent because a computer system typically creates VMs without a prior installed OS.

As discussed above in the Background, a computer system typically re-masters source media to address such problems. However, particular embodiments do not completely re-master the source media, store the re-mastered source media, and thereafter boot from the re-mastered source media. Rather, a hypervisor presents an emulated source media based on an original OS source media to the VM, as further described herein, avoiding the need to copy the entire contents of the original source media into a re-mastered version.

Various embodiments of the present disclosure are described in the context of installing an OS on a VM; however, it will be understood that techniques and systems described herein could be applied in any context where reconfiguration or modifications to software being executed on a device (whether a physical computing device or a virtual machine) would be useful. Additionally, techniques and systems described herein could also be applied to transform data from a format which is unreadable to an operating system to one which is readable by the operating system. Details regarding some of these other implementations are provided below.

Figure 1:
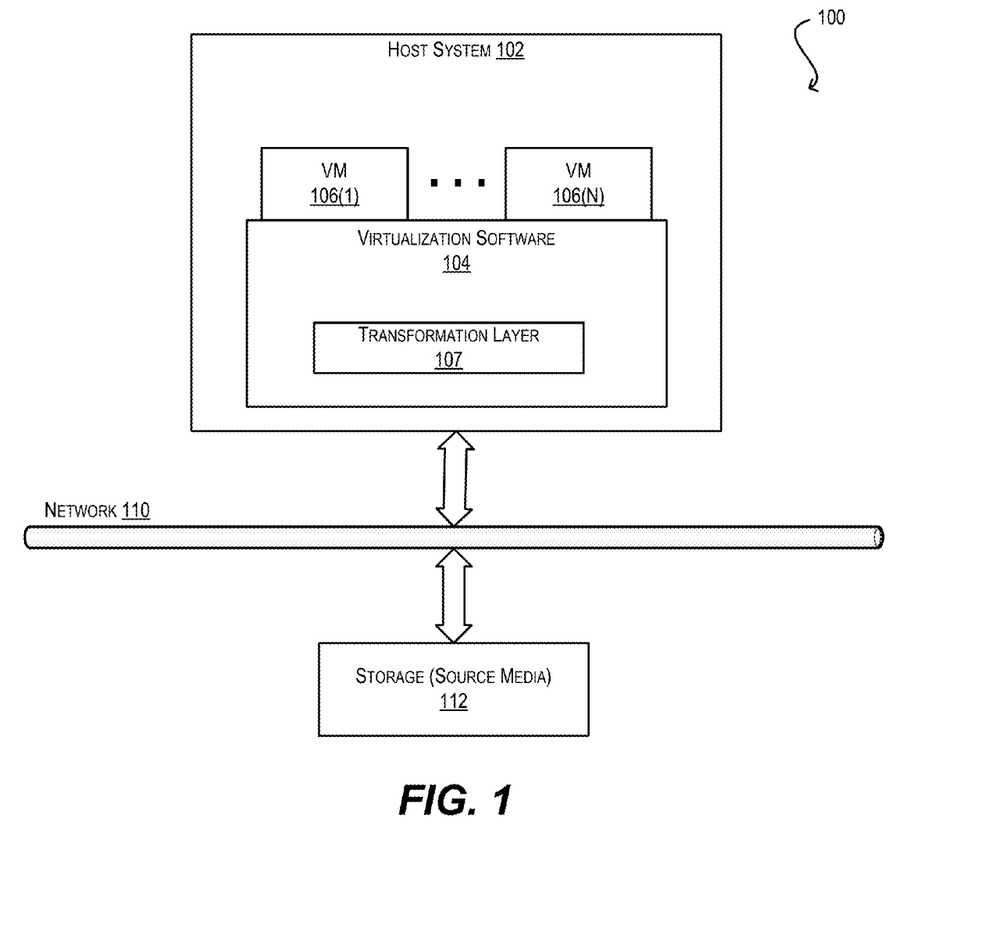
FIG. 1 depicts a block diagram of a virtual infrastructure that supports software installation using metadata transformations according to one embodiment.

FIG. 1 depicts a virtual infrastructure 100 that supports OS software installation via an emulated source media according to an embodiment. As shown, virtual infrastructure 100 includes a host system 102 that executes virtualization software 104. Virtualization software 104 (also known as a "hypervisor") is a software layer that provides an environment in which one or more deployed VMs 106(1)-106(N) can run. In one embodiment, virtualization software 104 can interact directly with the hardware platform of host system 102 without an intervening host operating system. In this embodiment, virtualization software 104 can include a kernel (not shown) that manages VM use of the various hardware devices of host system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

Virtual infrastructure 100 also includes a storage 112 that communicates with host system 102 via a network 110. Storage 112, as depicted, contains a source media.

For discussion purposes, storage 112 may store the original source media, but in practice any media by which data may be received by host computer 102 may store the original source media. The source media may be in the form of a block device (e.g., an optical disc or equivalent) or an image file. Also, although the term "media" is used, media may refer to any number of media including a single medium. Further, the use of "blocks" may correspond to any unit of data stored in the source media. Storage 112 may receive the source media via a web browser downloading the source media from a source (e.g., web site); or in other embodiments, the source media may be obtained from another source, such as a compact disk (CD) via a CD/DVD drive, or an image stored in a storage medium.

Virtualization software 104, also referred to herein as a "hypervisor", supports a transformation layer 107. Transformation layer 107 performs functions that allow hypervisor 104 to present the emulated source media to VM 106 in a configuration in which VM 106 can boot from without re-mastering the original source media.

Figure 2:
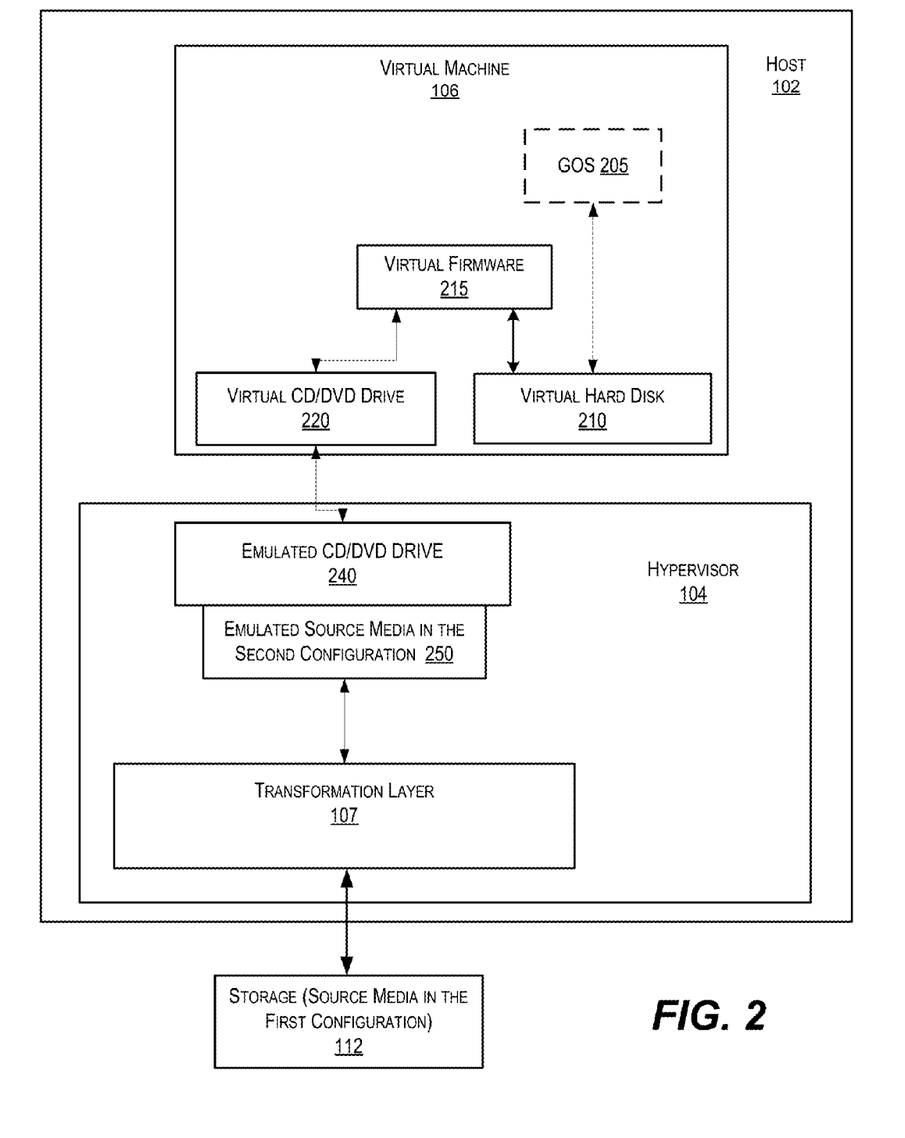
FIG. 2 depicts a block diagram showing more detail regarding the hypervisor and virtual machine depicted in FIG. 1 according to one embodiment.

Turning to FIG. 2, further detail is provided regarding the components of hypervisor 104 and virtual machine 106. Typically, virtualization technology configures components of a virtual machine to act as though they reside inside a self-standing physical computer, for example, rather than a virtual machine. This means that software components of a VM may act on the assumption that the VM has its own set of device drivers and network interfaces, among other things. Given this situation, virtualization technology generally provides, for example, a virtual CD/DVD drive, a virtual network interface, etc., for each virtual machine. For example, in the implementation depicted in FIG. 2, VM 106 may send a request to read a CD drive, for example, to virtual CD/DVD drive 220 associated with VM 106. Although a CD/DVD drive is discussed, other devices may be used, such as any block or image device.

In addition, as illustrated in FIG. 2, VM 106 also contains a virtual hard disk 210 and a virtual firmware 215. Upon powering on for the first time, a computer system or virtual machine first accesses a bootloader to install an OS. Virtual firmware 215 acts as a primary bootloader for VM 106. Among other things, virtual firmware 215 contains instructions telling VM 106 how to communicate with storage, such as external storage 112 or local storage (e.g., a hard disk (not shown)), as well as instructions virtual firmware 215 uses to locate a secondary bootloader provided in the OS software installation package itself. Virtual firmware 215 communicates with both virtual hard disk 210 and virtual CD/DVD drive 220.

As depicted, VM 106 may also have a guest Operating System (GOS) 105. GOS 105 is depicted with dashed lines to indicate that it does not exist in VM 106 prior to installation of the OS. When VM 106 installs GOS 105, GOS 105 will function along with virtual hard disk 210 and other components of VM 106 to support an OS environment in VM 106.

Hypervisor 104 may interact with virtual machine 106 in a variety of ways. Among other things, hypervisor 104 may include features for supporting the virtual device drivers and virtual network interfaces of VM 106. For example, hypervisor 104 may include an emulated CD/DVD drive 240 that interacts with virtual CD/DVD drive 220 of VM 106. Emulated CD/DVD drive 240 may interact with virtual CD/DVD drive 220 in such a manner that "emulates" the performance of an actual CD or DVD drive. It is noted that although VM 106 accesses the source media via emulated CD/DVD drive 240, other emulated devices may also be used.

Hypervisor 104 also receives and sends data to entities that are external to host computer 102. For example hypervisor 104 may send and receive data from an external storage 112. As noted above, in some embodiments, external storage 112 may store source media for OS installation at a company that offers operating systems. In one example, host 102 may access the source media through a network interface (not depicted) that connects to a network 110 that connects to storage 110.

Transformation layer 107 may act as an intermediary between VM 106 and the original source media. Because the original source media is not in a configuration VM 106 can boot from, transformation layer 107 provides transformation functions that make it possible for VM 106 to boot from an emulated source media 250 without re-mastering the source media.

To allow transformation layer 107 to perform such transformation functions, hypervisor 104 may retrieve metadata from the original source media that might be relevant to presenting emulated source media 250. Emulated source media 250 includes a different configuration (e.g., second configuration) from the original source media (e.g., first configuration). To generate the different configuration, transformation layer 107 may transform this metadata to produce reconfigured or synthetic metadata that transformation layer 107 stores in memory. This synthetic metadata is synthetic because transformation layer 107 has generated the synthetic metadata to represent the second configuration. The synthetic metadata allows hypervisor 104 to present emulated source media 250 to VM 106 in the second configuration. For example, in one embodiment, hypervisor 104 may use the synthetic metadata to attach the emulated source media to emulated CD/DVD drive 240. VM 106 then believes that a source media in the second configuration is available to read from and can send requests to the emulated source media to install the OS.

Hypervisor 104 then responds to the requests using the synthetic metadata. For example, as will be discussed in more detail below, if VM 106 requests specific blocks of unmodified data, hypervisor 104 may use transformation layer 107 to locate the data stored in the original source media, or if VM 106 requests metadata or modified data (as discussed further herein), hypervisor 104 uses transformation layer 107 to return portions of the synthetic metadata or the synthetic data.

Figure 3:
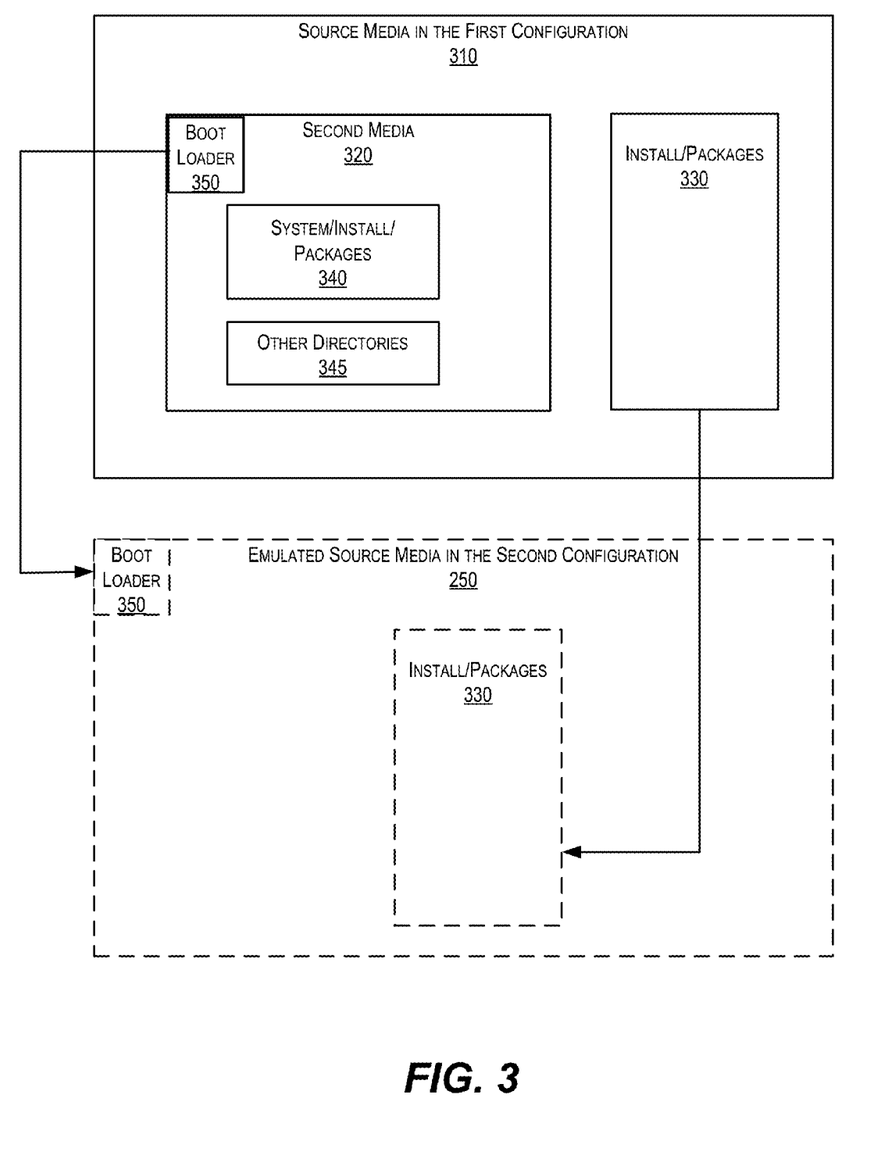
FIG. 3 depicts a diagrammatic representation showing the contents of a source media and a reconfigured emulated image of the source media according to one embodiment.

Before discussing the OS installation process in more detail, the reconfiguring of the first configuration of the source media to the second configuration that hypervisor 104 presents as emulated source media 250 will be described. FIG. 3 provides a diagrammatic representation of a source media in the first configuration 310 for installation of an OS. The representation provides a very high level view of a source media, and is intended only to provide one example of what is meant by reconfiguring or transforming source metadata.

Metadata may, among other things, provide information regarding the structure of data in a storage device. Software companies frequently organize source media in the form of files systems having associated directories and files, and metadata may describe such organization.

As one example of a non-bootable source media, as noted above, a company may no longer distribute copies of its most recent versions of OS software. However, a computing system may upgrade software by downloading all the components necessary for OS installation from a website, disk, or other medium. However, the download does not provide these components in a bootable configuration. One reason the download is not in a bootable configuration is because the company assumes the computer system has a prior version of the OS installed that can run a program that generates a bootable version from the download. However, a computer system that boots using firmware in an environment without an operating system cannot boot from the downloaded components to run the program.

In FIG. 3, element 310 labeled "source media in the first configuration" represents the downloaded components. As shown in FIG. 3, the source media 310 contains another media, which is labeled second image 320. That component contains a bootloader 350 that virtual firmware 215 would expect to receive in one of the initial blocks of data as part of the OS installation process. However, because bootloader 350 is located in an interior location within source media 320, as opposed to being located directly in source media 310, virtual firmware 215 may not be able to locate the bootloader using its usual procedure, and thus cannot boot from this configuration of the source media. For example, in the installation process, virtual firmware 215 first requests block 0 in a first partition of the source media as the first step in installing the OS, and virtual firmware 215 may expect block 0 to contain a portion of the secondary bootloader. However, with source media 310, as shown, the source media does not store the secondary bootloader at that location, which means firmware 215 cannot boot from the source media in the first configuration.

Further, source media 310 contains a packages folder 330, which includes components of an OS environment, such as a web browser, applications, etc., that VM 106 needs to install as part of the OS. Source media 310 stores packages folder 330 in a location outside of second media 320 (i.e., the media that firmware 215 would typically expect to install an OS from). Second media 320 may also contain other files relating to installation of OS; it may also contain other packages 340 and directories 345 not needed to install the OS.

It will be understood that the source media may take a variety of different forms. For example, in an embodiment different from the one described above, the source media may consist of a disk image containing an installer application, which itself consists of a directory containing a large number of files, including a second image, which in turn contains a third image, etc.

As shown, emulated source media 250 includes bootloader 350 in a location that firmware 215 expects to find a bootloader application. Further, emulated source media 250 includes packages folder 330 in locations in which VM 106 would expect when installing the OS.

Emulated source media 250 may take a variety of different forms. In one embodiment, emulated source media 250 may take the form of a hard drive image with a writable layer in front of it. In alternative embodiments, it may take the form of a USB flash drive image with a writable layer in front of it, a CD/DVD image, or another data structure.

Figure 4:
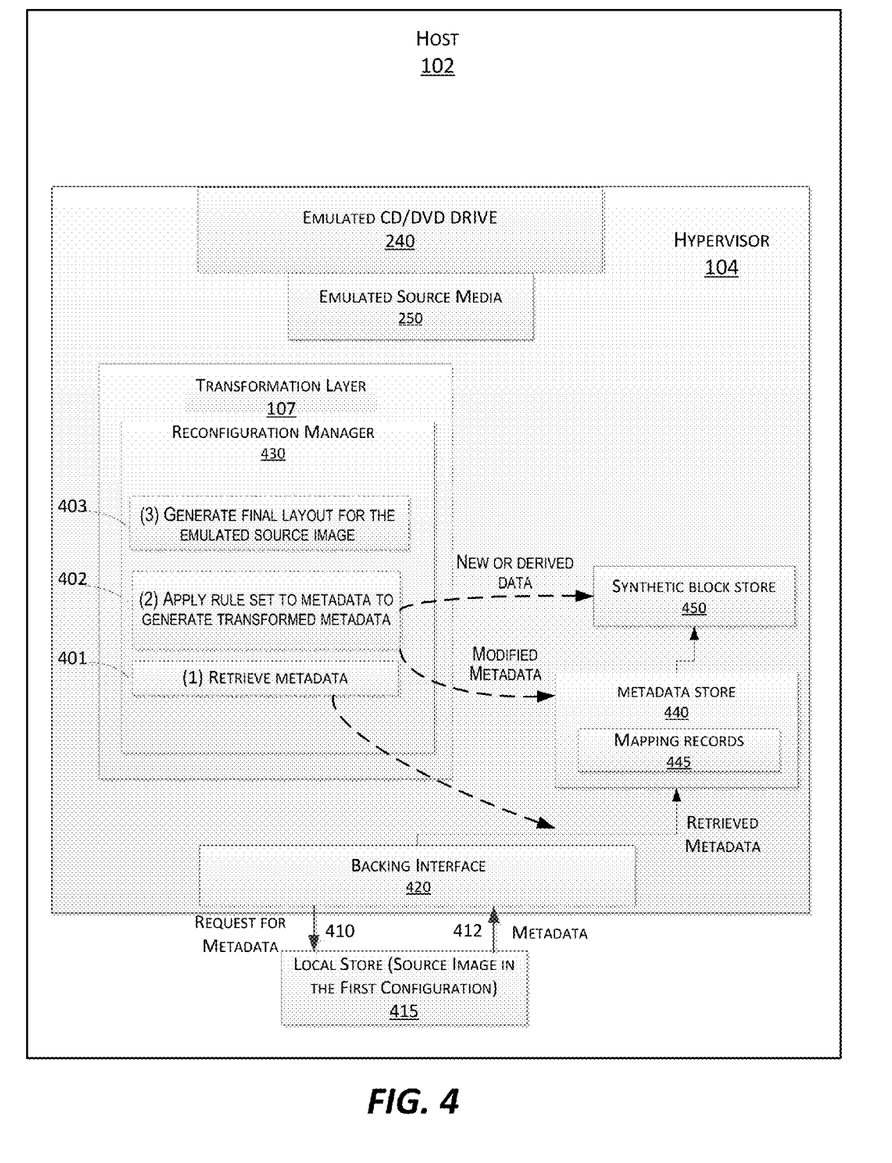
FIG. 4 depicts a flow within the virtual infrastructure of FIG. 2 in connection with software installation on a VM according to one embodiment.

FIG. 4 depicts a flow within the virtual infrastructure of FIG. 2 for generation of emulated source media 250 according to one embodiment.

Storage 112 contains the original source media in a first or original configuration as shown in element 310 of FIG. 3. The original source media stored in storage 112 may be transferred to local storage for host 102. A backing interface 420 of hypervisor 104 connects to links 410 and 412 that transmit communications between hypervisor 104 and a local store 415 that stores the original source media when host 102 retrieves the original source media from storage 112. Although host 102 stores the original source media in local store 415, in alternative embodiments, host 102 may not store the original source media locally, but may access the original source media stored in external storage 112.

As discussed above, the original source media is not re-mastered, but is rather stored in memory space backing hypervisor 104. However, VM 106 believes that emulated source media 250 is in the re-mastered configuration and VM 106 sends requests directed to the re-mastered configuration. But, in reality, hypervisor 104 receives the requests and uses transformation layer 107 to respond to the requests based on the original source media.

In various embodiments, while transformation layer 107 does not retrieve "data" of the original source media (the data remains in the source media in the original configuration stored in local store 415), transformation layer 107 retrieves "metadata" from the original source media, and reconfigures the metadata. Such reconfigured metadata is referred to herein as "transformed metadata" or "synthetic metadata" as further described herein.

At step (1) of the process depicted in FIG. 4 (reference numeral 401), reconfiguration manager 430 may send a request for selected metadata from the original source media to local store 415. In response, local store 415 may return the requested metadata, and reconfiguration manager 430 may store the selected metadata in a metadata store 440.

In one embodiment, reconfiguration manager 430 may use a transformation rule set to identify the selected metadata of the original source media to request, the selected metadata being that metadata required in the emulated source media in order to boot and install the OS from it. In various embodiments, this process can involve determining which locations in the source media, such as source partition(s) and/or file system(s), the transformation rule set indicates are (or might be) relevant to data or metadata needed for installing the OS. For each location, the selected metadata may include a data mapping record 445 that maps locations for emulated source media 250 to locations on the original source media. For example, for each file to be represented in any partition or file system on emulated source media 250, the selected metadata includes a record including a source identifier and the block location(s) of the extent(s) of data comprising the corresponding file.

At step (2) (reference numeral 402), reconfiguration manager 430 may apply the transformation rule set to the selected metadata stored in metadata store 440. The rules may cause reconfiguration manager 430 to perform various actions to create emulated source media 250. For example, emulated source media 250 may include modified metadata from metadata in the original source image, unmodified metadata retrieved from the original source image, new or derived data from data in the original source image, or new files or directories from files/directories in the original source image. The rules, when applied, cause reconfiguration manager 430 to create the above for emulated source media 250.

When a rule modifies metadata, reconfiguration manager 430 modifies the metadata and stores it in metadata store 440. This means that emulated source media 250 has metadata that is different from metadata in the first configuration. As one example, metadata relating to a secondary bootloader may indicate that a bootloader component appearing in a first location of the original source media should be used, whereas, to render the media bootable, use of a bootloader component at a second location of the original source media is desirable. Transformation layer 107 modifies the metadata to reference the second location, and then stores the modified metadata in metadata store 440.

When a rule results in the creation of new or derived data, reconfiguration manager 430 stores the new data in a synthetic block store 450. Note this new data is different from the data in the original source media and reconfiguration manager 430 needs to store it somewhere, such as in memory. Also, reconfiguration manager 430 creates or modifies a data mapping record for a corresponding new data (e.g., a file) such that the data mapping record references the appropriate region in synthetic block store 450 instead of a region in the original source media. That is, when transformation layer 107 creates derived data that is stored in synthetic block store 450, hypervisor 104 must retrieve this derived data from synthetic block store 450 rather than the original data from the original source media. One example of a situation where this might be useful is when the original source media contains defective data.

When a rule creates a new file or directory, reconfiguration manager 430 creates a corresponding record to the metadata in synthetic block store 450. This metadata references the new file or directory.

As noted above, when a rule results in the creation of modified metadata, configuration manager 430 may store the modified metadata in metadata store 440. Metadata store 440 may thus contain both metadata retrieved from the original source image, as well as modified metadata created as the result of application of the transformation rule set. Transformation layer 107 then generates synthetic metadata blocks based on such retrieved and modified metadata. The synthetic metadata blocks are then stored in synthetic block store 450, for example.

In some embodiments, transformation layer 107 generates "synthetic metadata" in the sense that the metadata is prepared for use with emulated source media 250. For example, where reconfiguration manager 430 configures emulated source media 250 as a file system, generating "synthetic metadata" might involve reconfiguration manager 430 assigning metadata to allocated metadata blocks in the file system, and then associating the metadata blocks with file system metadata such as file sizes, time stamps and directory structures. Reconfiguration manager 430 then stores synthetic metadata blocks in synthetic block store 450, and hypervisor 104 uses the synthetic metadata blocks to satisfy metadata block requests received from VM 106.

"Synthetic metadata" is generated as a result of applying the transformation rule set, and, in some embodiments, must be generated prior to receiving any block requests from VM 106. The "synthetic metadata" need not be in a format that is immediately understandable to the requester (i.e. guest OS 205 or firmware 215 within the VM 106). In some embodiments, "synthetic metadata" is not represented as a "block" or sector of data, it is merely an internal representation of the data that the requester is expecting to see. Transformation layer 107 uses such internal representation to generate the actual synthetic metadata blocks used to satisfy requests from VM 106. In other words, in some embodiments, a "synthetic metadata block" is the reconstruction of a chunk of synthetic metadata into a block or sector, formatted in a way that VM 106 can understand. In various embodiments, the "synthetic metadata block" can be generated from the "synthetic metadata" at three possible points in time: (1) at initialization (e.g., FIG. 5, which depicts an embodiment in which there may be no need to generate synthetic metadata blocks at runtime), (2) every time the VM requests a block (e.g., FIG. 6), or (3) upon the first request of each block from the VM (e.g. FIG. 7).

Transformation layer 107 uses data mapping records to map blocks of the emulated source media 250 with locations of the corresponding metadata or data in synthetic block store 450 or the original source media. Through use of these mapping records, transformation layer 107 retrieves data or metadata in response to data block requests from VM 106. This process allows transformation layer 107 to map blocks in emulated source media 250 to metadata, new or derived data, or data in the original source media, for example.

An entity that prepares a transformation rule may configure the transformation rule set in such a way that the rule set is directed to a particular source media or a set of source media. The entity may configure different transformation rule sets to operate on different source media. As mentioned above, it will be understood that source media may take a variety of different forms.

After applying the rule set, reconfiguration manager 430 generates a final layout for emulated source media 250. For example, at step (3) (reference numeral 403), reconfiguration manager 430 lays out the file system for emulated source media 250. Further, transformation layer 107 allocates blocks in the emulated source media 250 for each data file from the source media that is needed for installing the OS, as well as for additional free space as described by the transformation rule set. In performing this step, transformation layer 107 may also associate each allocated block with one of metadata (from the retrieved metadata), a synthetic data block (in synthetic block store 450), or data (in the original source media stored in local store 415).

After performing the above steps to allow hypervisor 104 to present emulated source media 250 to VM 106, hypervisor 104 can process input/output (I/O) requests from VM 106. In various embodiments, transformation layer 107 can generate the metadata initially or dynamically (on the fly). If transformation layer 107 uses the dynamic method, transformation layer 107 may generate enough metadata such that hypervisor 104 can present emulated source media 250 to VM 106 such that VM 106 can start the booting process. Then, transformation layer 107 can generate additional metadata as needed when hypervisor 104 receives requests from VM 106.

Figure 5:
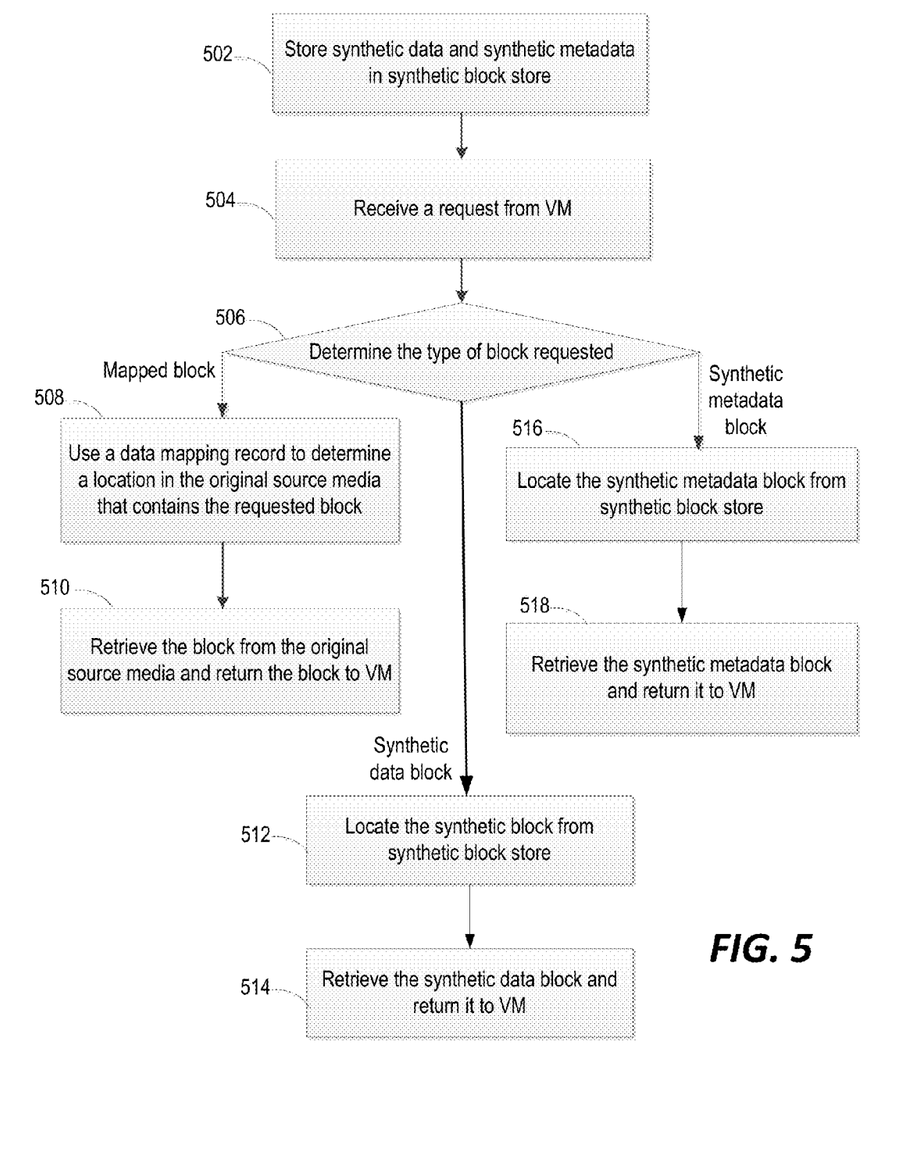
FIG. 5 depicts a first method for processing I/O requests using an initial generation of metadata according to one embodiment.

FIG. 5 depicts a first method for processing I/O requests using an initial generation of metadata according to one embodiment. At 502, transformation layer 107 stores synthetic data and synthetic metadata in synthetic block store 450. That is, transformation layer 107 has applied the rule set to the metadata and, as described above, transformed the metadata, and created new or derived blocks, and new files or directories, for example. Transformation layer 107 stores the transformed metadata in synthetic block store 450. The stored metadata may be referred to as "synthetic metadata" or "synthetic metadata blocks". Further, as discussed above, transformation layer 107 creates synthetic data blocks and new files/directories, if needed, and stores those synthetic data blocks and new files/directories in synthetic block store 450.

At 504, hypervisor 104 receives a request from VM 106. For example, VM 106 sends a request through virtual CD/DVD drive 220 to emulated source media 250, which is attached to emulated CD/DVD drive 240. In one embodiment, the discussion assumes the request is directed towards a block, but other means of identifying a region of data may also be used in other embodiments.

At 506, hypervisor 104 determines the type of block requested. For example, the request could be for a synthetic block or a mapped block. A mapped block may be a block that is stored in the source media in storage 112. A synthetic block may be one of synthetic metadata block or a synthetic data block.

At 508, if the type of block is a mapped block, transformation layer 107 uses a data mapping record from mapping records 445 to determine a location in the original source media that contains the requested block. At 510, hypervisor 104 retrieves the block from the original source media in local store 415 and returns the block to VM 106.

At 512, if the type of block is a synthetic data block, transformation layer 107 locates the synthetic block from synthetic block store 450. For example, if VM 106 requested a non-metadata synthetic block (e.g., a synthetic data block), transformation layer 107 determines a location from a mapping record where synthetic block store 450 is storing the synthetic data block. At 514, hypervisor 104 then retrieves the synthetic data block and returns the synthetic data block to VM 106.

At 516, if the type of block is a synthetic metadata block, transformation layer 107 locates the synthetic metadata block from synthetic block store 450. For example, transformation layer 107 determines a location where synthetic block store 450 is storing the synthetic metadata block. At 518, hypervisor 104 retrieves the synthetic metadata block and returns the synthetic metadata block to VM 106. Note that in both the synthetic data block and synthetic metadata block scenarios, hypervisor 104 did not retrieve data/metadata from the source image in storage 112. However, in the mapped data block example, hypervisor 104 did retrieve data from the original source media.

In the above, once hypervisor 104 retrieves the data from the original source image, synthetic data, or synthetic metadata, hypervisor 104 returns the data to VM 106. Hypervisor 104 returns the data to VM 106 in such a way that VM 106 believes it directly received the data from the requested location, i.e., the original source media. But in fact, hypervisor 104 retrieves the data using transformation layer 107 and provides it to emulated source media 250, which in turn passes the data to virtual CD/DVD drive 220, which in turn provides the data to firmware 215 of VM 106 (which originally requested the data).

In the case where transformation layer 107 generates metadata on the fly, two different scenarios may be used, one with caching and one without. The caching scenario caches synthetic metadata when generated, but the non-caching scenario does not cache any generated metadata. Thus, the non-caching scenario generates synthetic metadata every time while the caching scenario may avoid synthetic metadata generation if transformation layer 107 has already generated the synthetic metadata.

Figure 6:
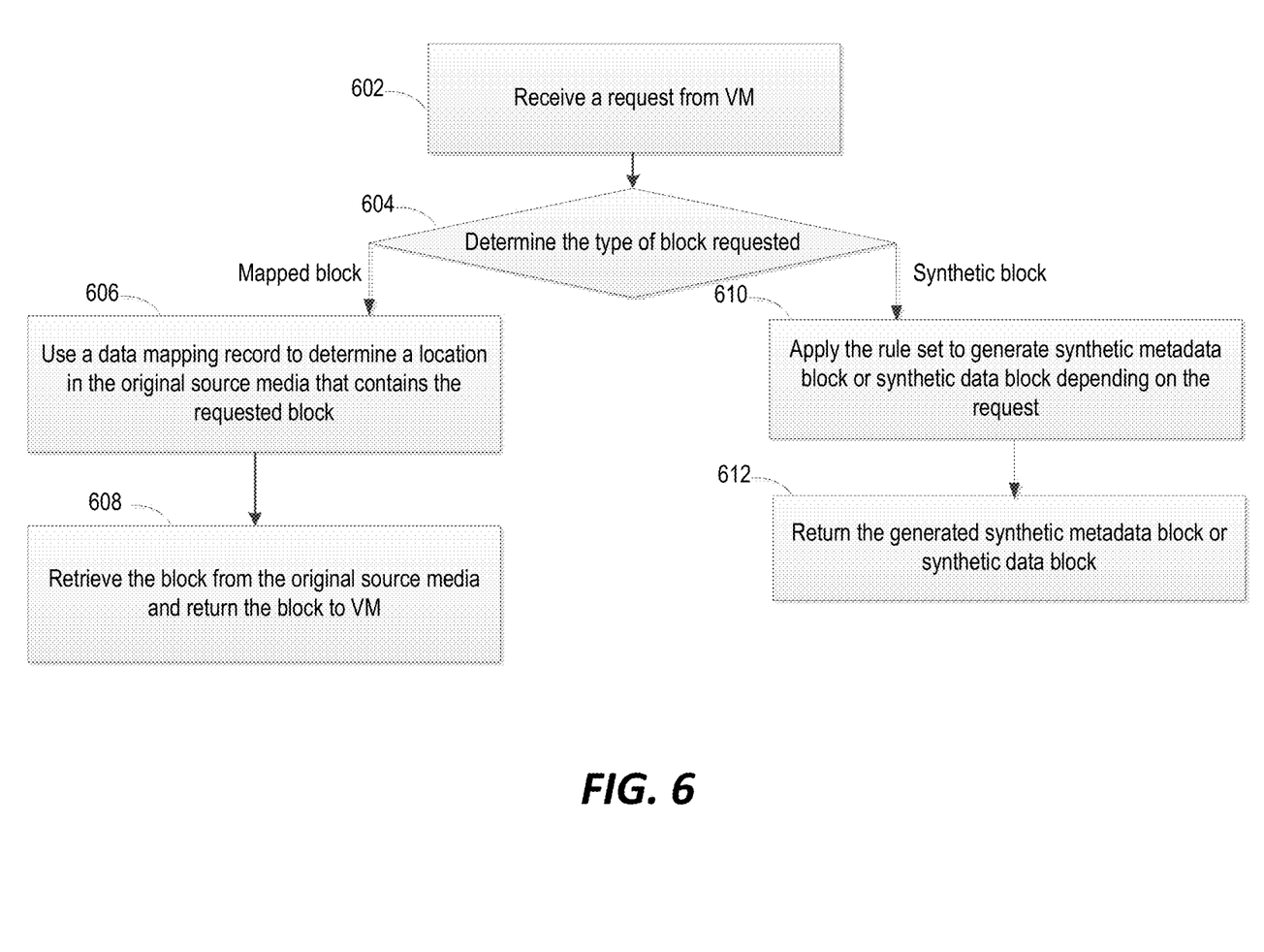
FIG. 6 depicts a second method for processing I/O requests using dynamic generation of metadata without caching according to one embodiment.

FIG. 6 depicts a second method for processing I/O requests using dynamic generation of metadata without caching according to one embodiment. At 602, hypervisor 104 receives a request from VM 106. At 604, hypervisor 104 determines the type of block requested. As above, the request could be for a synthetic block or a mapped block. For the mapped block, the process is the same as described in FIG. 5. That is, at 606, if the type of block is a mapped block, transformation layer 107 uses a data mapping record to determine a location in the original source media that contains the requested block, and at 608, hypervisor 104 retrieves the block from the original source media and returns the block to VM 106.

However, if the type of block is a synthetic block, then at 610, transformation layer 107 generates a synthetic data block or a synthetic metadata block depending on the request. This may involve transformation layer 107 using data or modified metadata resulting from the application of the rule set to generate a synthetic data block or synthetic metadata block. This step in effect, applies the rules dynamically based on the request. At 612, hypervisor 104 returns the generated synthetic data block or synthetic metadata block to VM 106.

Figure 7:
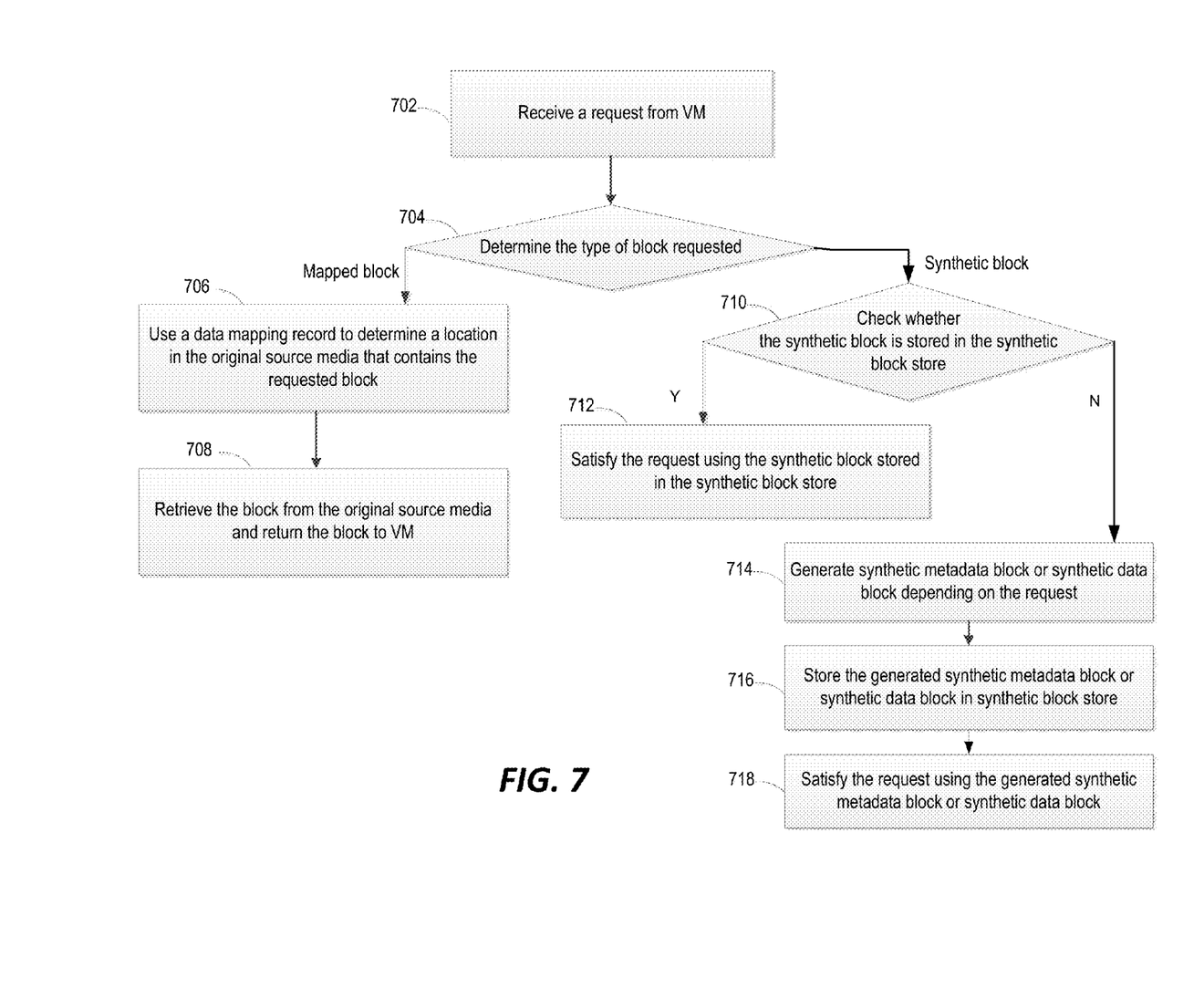
FIG. 7 depicts a third method for processing I/O requests using dynamic generation of metadata with caching according to one embodiment.

FIG. 7 depicts a third method for processing I/O requests using dynamic generation of metadata with caching according to one embodiment. At 702, hypervisor 104 receives a request from VM 106. At 704, hypervisor 104 determines the type of block requested. As above, the request could be for a synthetic block or a mapped block. For the mapped block, steps 706 and 708 are the same as step 606 and 608 in FIG. 6.

However, if the type of block is a synthetic block, transformation layer 107 may have already generated the synthetic block and stored the synthetic block in synthetic block store 450. Thus, at 710, transformation layer 107 checks whether the synthetic block is stored in synthetic block store 450. If so, at 712, hypervisor 104 satisfies the request using the synthetic blocks stored in synthetic block store 450. However, if the synthetic block is not stored in synthetic block store 450, at 714, transformation layer 107 generates a synthetic metadata block or synthetic data block corresponding to the request. At 716, transformation layer 107 stores the generated synthetic metadata block or synthetic data block in synthetic block store 450. Then, at 718, hypervisor 104 satisfies the request using the generated synthetic metadata block or synthetic data block.

Using such metadata, firmware 215 may navigate what appears to be a re-mastered file system, and identify the data files it needs for performing the OS installation process. Notably, firmware 215 may not know the details of the file system hierarchy prior to starting the booting process, therefore, it may be necessary to provide such a view, and in a configuration consistent with what the firmware expects to see, in order to enable the firmware to perform its tasks. Further, in the example of installation of an OS, once firmware 215 retrieves a secondary bootloader, which, as noted above, may be downloaded as part of the installation software, the bootloader or associated files may also use the view of a file system provided by hypervisor 104 in a re-mastered (second) configuration to perform tasks.

For example, the bootloader may launch a process that leads to control being passed to an installer application included in the source media; the installer application may need to retrieve and install each of the various packages relating to OS applications, such as web browser etc., and in performing such installations, the installer application may need to see where the applications are on the source media.

Installation of an operating system typically involves installing whatever features are provided in the OS source media. However, in a variety of different circumstances, it can be desirable to improve or customize that process. Typically available tools are limited in the degree of customization which may be achieved. Various embodiments of the present disclosure provide a lever whereby a number of different improvements can be made to the process. As discussed above, one example involves altering the configuration of the provided source media in the event that the source media is unbootable for some reason. In this circumstance, as described herein, if all the components of a bootable version of the software are present in the source media, it is possible to reconfigure those components using techniques and systems set forth herein to produce a bootable source media.

Correcting Defective Data in OS Installation Media

In another example where customization may be desirable, the provided OS source media may contain defective data, or data that renders the media unbootable. For example, a recent version of a Linux distribution has a feature that renders the media unbootable. The problem is correctable, but it generally requires a separate process to correct. In such circumstances, hypervisor 104 may correct the source media as part of the OS installation process using techniques and systems of the present disclosure. For example, in one embodiment, hypervisor 104 may retrieve the defective data block from the source media, correct the defect, and then place the modified data block in synthetic block store 450. Further, the mapping record for that block of data may be updated to indicate the location of the modified data block in synthetic block store 450, rather than a location in the underlying source image.

Installing Additional Components as Part of the OS Installation Process

In another example, it may be desirable to customize the OS installation process to add desired features to the operating system. One example might include adding additional device drivers as part of an OS installation process. Another example might include adding updates to the OS or other software.

Various embodiments may achieve this result by applying the same process used on the OS source media, to media for installation of the desired additional device drivers. For example, for additional device driver installation, in various embodiments, rules in the transformation rule set might specify particular metadata from such device driver source media to be retrieved. Once retrieved, hypervisor 104 may perform the same process it performs on OS source media applying the transformation rule set to re-master the retrieved device driver source media, generating a second configuration, and then adding the transformed device drive metadata to synthetic block store 450, in the same manner as performed on metadata from the OS source media. The data relating to the installation of the additional device drivers may then be accessed in the same manner used for data in the original OS source media. That is, hypervisor 104 may generate mapping records which map device driver metadata stored in synthetic block store 450 (after the transformation process) to data blocks in the device driver source media. In this way, it may be unnecessary to perform separate processes to install additional device drivers to a physical computer system or virtual machine.

Installing OS in Remote Computers

The techniques and systems described above in connection with installation of software on a virtual machine could be adapted to other contexts as well. For example, in various embodiments, techniques and systems of the present disclosure may be used to install OS or application software on remote computers that are part of a centralized system, where such remote computers are accessible by a central server or other computing device. The central server could, in some embodiments, perform similar functions to those performed by hypervisor 104 and transformation layer 107 in the above described embodiments in installing an OS or other software on the remote computers. Remote media mechanisms for installing software on distributed remote computers using a central server will be known to one of skill in the art.

Installing OS on a Physical Computer

Alternatively, in various embodiments, systems and techniques of the present disclosure could also be applied to the installation of OS or other software on physical computing devices. Here, the difference from the context for virtual machines is that no existing component (such as hypervisor 104) typically is interposed in a physical computer between an interface for receiving a source media and the computer system. Accordingly, adapting the above described techniques so that they may be used in the context of an OS or other software installation on a physical computing device, requires providing a new transformation component that can perform similar functions to those performed by hypervisor 104 in the above described embodiments.

Various architectures could be used to implement such embodiments. In one example, the functions of a transformation component may be performed by a physical device, for example, an embedded computer, interposed between a physical optical drive (e.g. CD drive at which the source media is being accessed), for example, and the computer system to which the physical optical drive is attached. Such an embedded computer might be able to accept some form of storage device (e.g., Serial ATA, SCSI, IDE, USB, etc.) by acting as a host to the storage media. Such embedded computer may also provide a transformed "view" of that storage device (e.g., by presenting the emulated source media 250) through another connector (e.g., Serial ATA, SCSI, IDE, USB, etc.) to be connected the physical computing device. To envisage how such an embodiment could look, take as an example a regular USB CD/DVD drive, which can connect through a USB connector to a host computer. In various embodiments, USB CD/DVD drive may be connected instead to an embedded computer implementing the functionalities of hypervisor 104 and transformation layer 107 in the above described embodiments.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Disc)-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for executing software that cannot be executed in a first configuration, the method comprising:
    determining, by a computer system, source media for the software stored in a first data store, the source media being in the first configuration in which the computer system cannot execute the software to perform a task due to the computer system not being able to locate a portion of the software in a first location in the first configuration;
    retrieving, by the computer system, metadata relating to executing the software from the source media;
    transforming, by the computer system, the retrieved metadata to generate a second configuration of the source media according to a transformation rule set, wherein the software can be executed in the second configuration;
    storing, by the computer system, the transformed metadata in a second data store;
    presenting, by the computer system, the second configuration of the source media based on the transformed metadata in which the portion of the software is presented in a second location in the second configuration that is different from the first location in the first configuration;
    receiving, by the computer system, a request relating to executing the software to perform the task, the request directed to the portion of the software in the second location in the second configuration of the source media;
    determining, by the computer system, when the request should be satisfied using the portion of software in the first location in the first configuration of the source media; and
    when the request should be satisfied using the portion of software in the first location in the first configuration of the source media, satisfying, by the computer system, the request by using the transformed metadata in the second data store to locate information from the first location in the first configuration of the source media to have the task performed.

2. The method of claim 1, wherein:
    the request is for a data block in the second configuration of the source media, and satisfying comprises using a mapping of the second location in the second configuration to the first location in the first configuration to determine data associated with the data block at the first location in the first configuration of the source media stored in the first data store.

3. The method of claim 1, further comprising:
determining when the request is for a metadata block; and
when the request is for the metadata block, providing a portion of the transformed metadata stored in the second data store corresponding to the metadata block to satisfy the request.

4. The method of claim 1, wherein transforming comprises:
generating a new data block or derived data block for the second configuration using information from the source media in the first configuration;
storing the new data block or the derived data block in the second data store; and
creating a mapping record for the new data block or the derived data block such that the request for the new data block or derived data block is satisfied from the second data store when the request is for the new data block or the derived data block, wherein the request is not satisfied from the first configuration of the source media stored in the first data store.

5. The method of claim 1, further comprising:
determining whether additional metadata needs to be generated based on the request;
when additional metadata needs to be created, generating the additional metadata from the transformed metadata; and
using the additional metadata to satisfy the request.

6. The method of claim 1, wherein:
a hypervisor emulates the second configuration of the source media and presents the emulated second configuration of the source media to a virtual machine,
the request is received from the virtual machine and directed to the emulated second configuration, and
the hypervisor uses the transformed metadata to satisfy the request.

7. The method of claim 6, wherein:
the emulated second configuration is attached to an emulated device,
the source media is stored as backing to the hypervisor, and
the source media is used to satisfy requests for data blocks in the emulated second configuration.

8. The method of claim 1, further comprising:
when the request should be satisfied using the portion of software in the first location in the first configuration from the source media using a mapped block in the source media in the first configuration:
using a data mapping record to determine a location in the source media that contains the mapped block; and
retrieving the mapped block from the source media from the first data store;
when the request comprises a request for a synthetic data block:
locating the synthetic block from the second data store; and
retrieving the synthetic data block from the second data store;
when the request comprises a request for a synthetic metadata block:
locating the synthetic metadata block from the second data store; and
retrieving the synthetic metadata block from the second data store.

9. A non-transitory computer readable storage medium having stored thereon computer software executable by a computer processor, the computer software embodying a method for executing software that cannot be executed in a first configuration, the method comprising:
determining source media for the software stored in a first data store, the source media being in the first configuration in which the computer system cannot execute the software to perform a task due to the computer system not being able to locate a portion of the software in a first location in the first configuration;
retrieving metadata relating to executing the software from the source media;
transforming the retrieved metadata to generate a second configuration of the source media according to a transformation rule set, wherein the software can be executed in the second configuration;
storing the transformed metadata in a second data store;
presenting the second configuration of the source media based on the transformed metadata in which the portion of the software is presented in a second location in the second configuration that is different from the first location in the first configuration;
receiving a request relating to executing the software to perform the task, the request directed to the portion of the software in the second location in the second configuration of the source media;
determining when the request should be satisfied using the portion of software in the first location in the first configuration of the source media; and
when the request should be satisfied using the portion of software in the first location in the first configuration of the source media, satisfying the request by using the transformed metadata in the second data store to locate information from the first location in the first configuration of the source media to have the task performed.

10. The non-transitory computer readable storage medium of claim 9, wherein:
the request is for a data block in the second configuration of the source media, and
satisfying comprises using a mapping of the second location in the second configuration to the first location in the first configuration to determine data associated with the data block at the first location in the first configuration of the source media stored in the first data store.

11. The non-transitory computer readable storage medium of claim 9, further comprising:
determining when the request is for a metadata block; and
when the request is for the metadata block, providing a portion of the transformed metadata stored in the second data store corresponding to the metadata block to satisfy the request.

12. The non-transitory computer readable storage medium of claim 9, wherein transforming comprises:
generating a new data block or derived data block for the second configuration using information from the source media in the first configuration;
storing the new data block or the derived data block in the second data store; and
creating a mapping record for the new data block or the derived data block such that the request for the new data block or derived data block is satisfied from the second data store when the request is for the new data block or the derived data block, wherein the request is not satisfied from the first configuration of the source media stored in the first data store.

13. The non-transitory computer readable storage medium of claim 9, wherein the method for performing software installation further comprises:

determining whether additional metadata needs to be generated based on the request;

when additional metadata needs to be created, generating the additional metadata from the transformed metadata; and using the additional metadata to satisfy the request.

14. The non-transitory computer readable storage medium of claim 9, wherein:

a hypervisor emulates the second configuration of the source media and presents the emulated second configuration of the source media to a virtual machine, the request is received from the virtual machine and directed to the emulated second configuration, the hypervisor uses the transformed metadata to satisfy the request.

15. A system for executing software that cannot be executed in a first configuration, the system comprising:

a computer processor configured to:

determine source media for the software stored in a first data store, the source media being in the first configuration in which the computer system cannot execute the software to perform a task due to the computer system not being able to locate a portion of the software in a first location in the first configuration;

retrieve metadata relating to executing the software from the source media;

transform the retrieved metadata to generate a second configuration of the source media according to a transformation rule set, wherein the software can be executed in the second configuration;

store the transformed metadata in a second data store;

present the second configuration of the source media based on the transformed metadata in which the portion of the software is presented in a second location in the second configuration that is different from the first location in the first configuration;

receive a request relating to executing the software to perform the task, the request directed to the portion of the software in the second location in the second configuration of the source media;

determine when the request should be satisfied using the portion of software in the first location in the first configuration of the source media; and when the request should be satisfied using the portion of software in the first location in the first configuration of the source media, satisfy the request by using the transformed metadata in the second data store to locate information from the first location in the first configuration of the source media to have the task performed.

16. The system of claim 15, wherein:

the request is for a data block in the second configuration of the source media, and satisfy comprises use a mapping of the second location in the second configuration to the first location in the first configuration to determine data associated with the data block at the first location in the first configuration of the source media stored in the first data store.

17. The system of claim 15, wherein the computer processor is further configured to:

determine when the request is for a metadata block; and when the request is for the metadata block, provide a portion of the transformed metadata stored in the second data store corresponding to the metadata block to satisfy the request.

18. The system of claim 15, wherein:

wherein transform comprises:

generate a new data block or derived data block for the second configuration using information from the source media in the first configuration;

store the new data block or the derived data block in the second data store; and create a mapping record for the new data block or the derived data block such that the request for the new data block or derived data block is satisfied from the second data store when the request is for the new data block or the derived data block, wherein the request is not satisfied from the first configuration of the source media stored in the first data store.

19. The system of claim 15, wherein the computer processor is further configured to:

determine whether additional metadata needs to be generated based on the request;

when additional metadata needs to be created, generate the additional metadata from the transformed metadata; and use the additional metadata to satisfy the request.

20. The system of claim 15, wherein:

a hypervisor emulates the second configuration of the source media to a virtual machine, the request is received from the virtual machine and directed to the emulated second configuration, the hypervisor uses the transformed metadata to satisfy the request.

\* \* \* \* \*